Aug. 13, 1929.  L. H. WISENOR  1,724,244
LIDDED CLOSURE FOR COOKING UTENSILS
Filed July 7, 1927
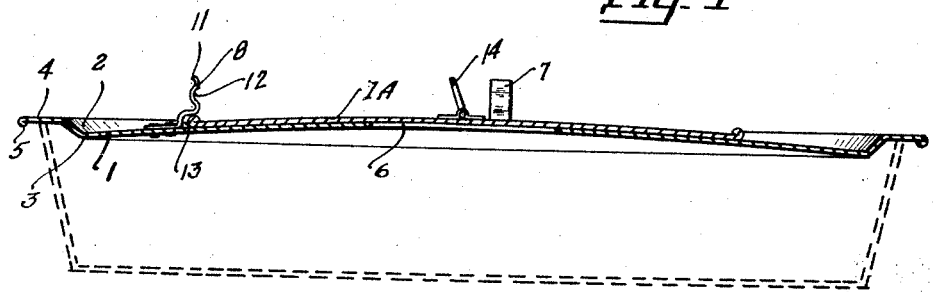
*Fig. 1*
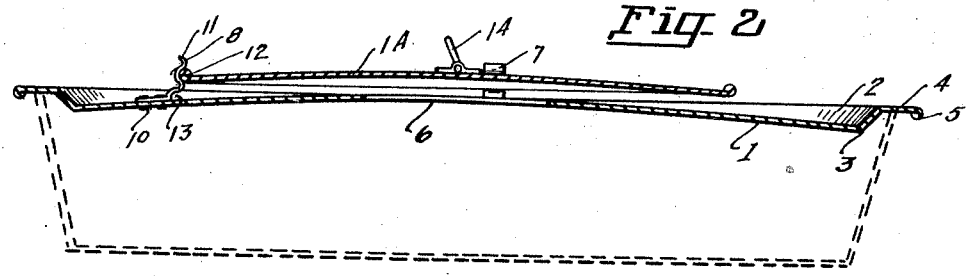
*Fig. 2*
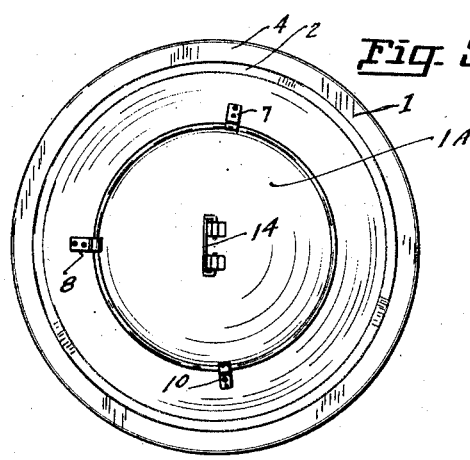
*Fig. 3*
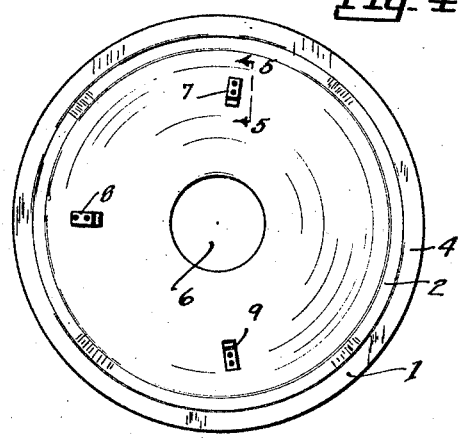
*Fig. 4*
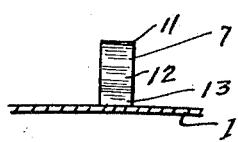
*Fig. 6*
*Fig. 5*
Inventor
Lemuel H. Wisenor
By Thomas Bieyne
Attorney Patented Aug. 13, 1929.

1,724,244

UNITED STATES PATENT OFFICE.

LEMUEL H. WISENOR, OF PORTLAND, OREGON, ASSIGNOR OF ONE-HALF TO GERTRUDE C. WISENOR, OF PORTLAND, OREGON.

LIDDED CLOSURE FOR COOKING UTENSILS.

Application filed July 7, 1927. Serial No. 203,996.

My invention relates to improvements in closures for cooking utensils in which the main lid or closure is adapted to fit the cooking utensil and having one or more openings disposed centrally of the lidded closure, and having one or more engaging locking and supporting elements disposed radially of the central opening, and a secondary lid adapted to closely fit the primary lid and to close the opening or openings therethrough, and having means for maintaining the secondary lid in tight relationship with the primary lid or having means for maintaining the secondary lid in spaced relationship with the primary lid.

The primary object of my device consists in providing one or more openings through the primary lid of cooking utensils, providing a secondary lid adapted to cooperate with the primary lid to close such opening or to maintain a lid thereabove, at the same time providing for the escapement of the gases formed within the cooking utensil and prevent the greases and other liquids from being thrown from the cooking utensil and become deposited upon the upper portion of the lid or upon the adjacent cooking devices and kitchen walls and the apparel of the operator, cook, or chef.

Still further objects of my invention, consist in providing a simple and efficient device wherein and whereby the user of the same can predetermine the cooking conditions to be maintained within the cooking device.

A still further object of my invention, consists in providing means whereby the user of the same may control, within limited temperature ranges, the temperature to be maintained within the cooking space of the cooking utensil.

With these and incidental objects in view, the invention consists in certain novel features of construction and combination of parts, the essential elements of which are set forth in the appended claims, and a preferred form of embodiment of which is hereinafter shown with reference to the drawings which accompany and form a part of this specification.

In the drawings:—

Fig. 1 is a vertical, sectional, side elevation, taken through one of my new and improved lidded closures, illustrating the primary lid and the secondary lid in intimate contact with each other.

Fig. 2 is a like sectional view, taken with the secondary lid shown being supported in spaced relationship with that of the primary lid.

Fig. 3 is a top, plan view, of one of my new and improved lidded closures with the secondary lid in position upon the primary lid.

Fig. 4 is a top, plan view, of the primary lid with the secondary lid shown removed.

Fig. 5 is a sectional side elevation, taken on line 5—5 of Fig. 4, looking in the direction indicated.

Fig. 6 is a front elevation, of the mechanism illustrated in Fig. 5.

Like reference characters refer to like parts throughout the several views.

1 is the primary lid, preferably formed of sheet metal material having an annular top having an outwardly sloping surface and having an upwardly inclined annular side wall 2, to form a depression 3 therebetween. Between the outer peripheral edge 15 of the lid and the inclined surface, is a substantially horizontal portion 4.

I have here shown a single opening 6, disposed centrally of the primary lid, but I do not wish to be limited to a single opening as one or more openings may be made to give equally satisfactory results. I form a secondary lid 7$^a$ substantially larger in diameter than the diameter of the central opening or openings disposed through the primary lid and dispose brackets 7, 8 and 9 upwardly inclined from the primary lid and secure the same thereto by any suitable fastening means, as by spot welding, or by fastening elements 10, as rivets. The inner upper surface of the brackets have an outwardly curved upper surface 11, and having depressions 12 disposed in the side walls of the same, and having a deeper depression 13 disposed adjacent the base of the brackets.

The brackets 7 and 9 are spaced somewhat farther apart than are the brackets 7 and 8, and 8 and 9, this is to allow the secondary lid to be slipped therebetween to be held in either the position in Figure 1 or the position shown in Figure 2.

I have observed in cooking, as in frying meat, that there is a tendency for the meat during the frying operation to pop or crack and to violently liberate fine particles of mineral fat, the same splashing upon the cooking stove and upon the garments of the user of the device and upon the side walls of the kitchen; and yet a lid is essential to maintain sufficient cooking heat within the bowl portion of the cooking utensil upon which the lid is placed. To prevent this, I have found that by placing the secondary lid 7^A in spaced relationship with the primary lid, sufficiently to permit of a free escapement of the gases developed within the body portion of the cooking utensil that this tendency is prevented and at the same time a higher heat may be maintained within the bowl portion of the cooking utensil; whereas in certain other cooking operations the same lid may be used as a tight closure by the placing of the secondary lid in intimate contact with the primary lid. To further maintain an intimate relationship between the primary and the secondary lid, the secondary lid may be made to engage the underside of the bracket, and into the depression 13 and where the bracket is made of spring material, an intimate close working relationship may be made to maintain between the primary and the secondary lid. Any suitable bale lifting element 14 may be provided upon the secondary lid to facilitate the manipulation of the same. While I have here shown the brackets as three in number, I do not wish to be limited to any specific number of brackets, nor to the specific form of construction of the same.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claims which follow.

What I claim is:

A lid for cooking vessels and the like, including a primary and a secondary lid, said primary lid being provided with a central aperture, said secondary lid being capable of covering such aperture, brackets secured to said primary lid projecting upwardly therefrom, said brackets being spaced apart the spacing between two of said brackets being sufficient to allow the secondary lid to be slipped therebetween, each of said brackets where it joins the primary lid being offset to provide a recess for receiving the edges of the secondary lid thereby allowing said secondary lid to be held in contact with said primary lid, and each of said brackets further being provided with a recess adjacent the top thereof for receiving the edge of said secondary lid thereby allowing said secondary lid to be held in a position spaced above said primary lid.

LEMUEL H. WISENOR.